Oct. 14, 1924.                                                        1,511,854
M. F. WATERS
COMBINED FLOW TANK, SEPARATOR, AND SCRUBBER
Filed May 23, 1924
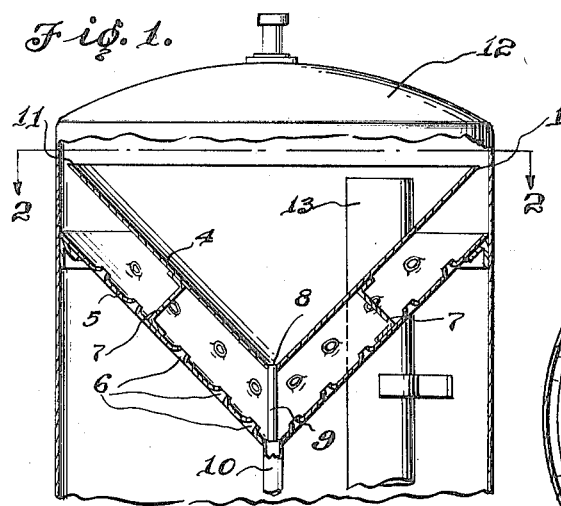
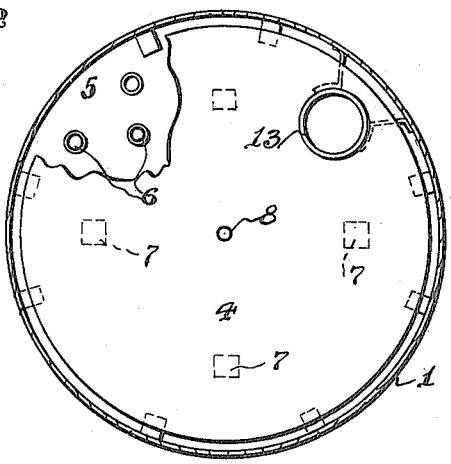
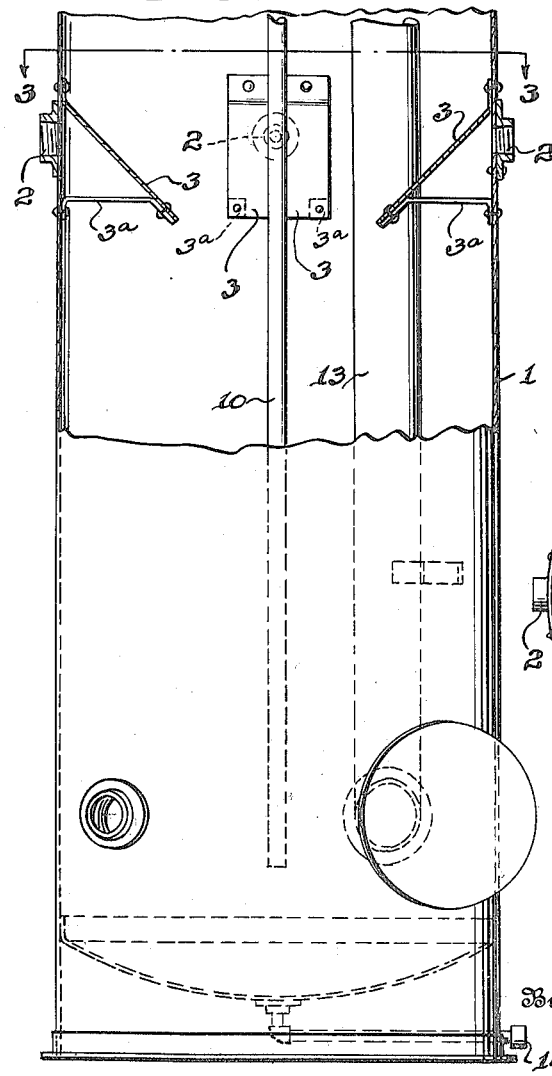
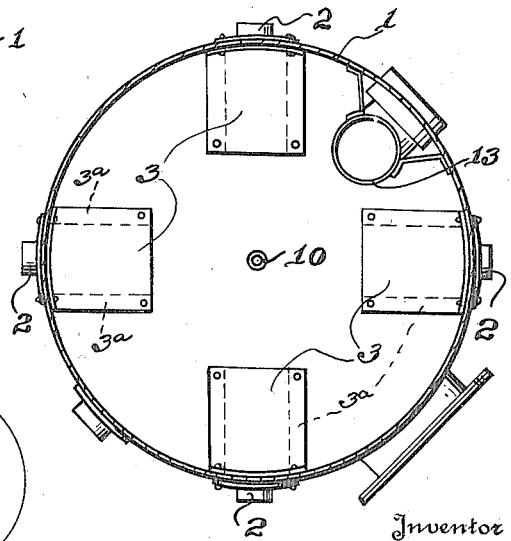
Inventor
M. F. Waters
By George A. Brewer
Attorney Patented Oct. 14, 1924.

1,511,854

UNITED STATES PATENT OFFICE.

MILLARD F. WATERS, OF TULSA, OKLAHOMA, ASSIGNOR TO SMITH SEPARATOR COMPANY, OF TULSA, OKLAHOMA.

COMBINED FLOW TANK, SEPARATOR, AND SCRUBBER.

Application filed May 23, 1924. Serial No. 715,497.

*To all whom it may concern:*

Be it known that I, MILLARD F. WATERS, a citizen of the United States, residing at Tulsa, in the county of Tulsa and State of Oklahoma, have invented certain new and useful Improvements in Combined Flow Tanks, Separators, and Scrubbers; and I do hereby declare the following to be a full, clear, and exact description of the invention, such as will enable others skilled in the art to which it appertains to make and use the same.

My invention consists in an improved combined oil and gas flow tank, separator and scrubber, and has for its object to provide an apparatus which will thoroughly separate all of the heavy petroleum products from the gas and produce a substantially dry gas, conducting any oil products which may have risen with the gas, back to the oil container.

This separation and scrubbing is brought about by the use of an improved system of baffles, which when the oil and gas enter the tank, deflect the oil downwardly and allow the gas to rise. The baffles are so arranged, as to permit the gas to be scrubbed along the bottom side of one of the baffles, passing through ports in said baffle and finally being forced against the under side of the top head of the separator tank.

With the above and other objects in view, which will appear as the description proceeds, my invention consists in the novel features herein set forth, illustrated in the accompanying drawings and more particularly pointed out in the appended claims.

In the drawings,

Fig. 1 is a view partly in section and broken away, showing my arrangement of conical baffles and the baffles on the oil and gas inlets.

Fig. 2, is a view taken on line 2—2, Fig. 1, showing a portion of the top baffle broken away, and Fig. 3 is a view taken on line 3—3, Fig. 1.

Referring to the drawings, in which numerals of like character designate similar parts throughout the several views, 1 represents the separator tank proper which may be of the usual form of oil and gas flow tank. At points intermediate the top head and center of the tank 1, I provide oil and gas inlets 2 which are connected directly to the line from the wells. On the inner wall of the tank, opposite these inlets 2, I provide baffles 3, which are riveted or welded to the side of the tank at substantially a 45° angle having supporting members 3ª, as shown in Fig. 1.

Near the top of the tank 1, I provide two conical baffles 4 and 5, the latter being perforated with staggered ports 6, and welded to the side of the tank. After the ports 6 are drilled in the baffle 5, a taper punch is used from the lower side so as to give the baffle a raised effect on the upper side, the function of which will be hereinafter described. 4 designates the other conical baffle, which is secured to the baffle 5 by means of supports 7. This baffle is solid except for an aperture 8 opening into a drain pipe 9, and unlike the baffle 5, is spaced apart from the wall of the tank as shown in Figs. 1 and 2. Just below the drain pipe 9 on the baffle 4, I provide a larger drain pipe 10 which is secured to the perforated baffle 5 at its apex, and extends downwardly to the oil container.

The movement of the oil and gas is as follows: The oil and gas enter at the inlets 2, and come in contact with the angular baffles 3, where they are broken up and the separation is started. The oil is deflected downwardly and the gas rises until it comes in contact with the perforated baffle 5 where more of the oil properties are taken out of the gas. In this manner, the gas is allowed to expand immediately before reaching the baffle, and in striking the same, the greater portion of oil carried over is knocked back. The gas then passes through the ports 6 in the baffle 5, and comes in contact immediately with the solid baffle 4. Some of the lighter oil properties are carried through the ports 6 in the baffle 5, and when they come in contact with the solid baffle 4, are deflected back on the upper surface of the lower baffle 5. The ports in this baffle being raised, as before mentioned, the oil does not pass back through the ports, but flows around the same and enters the drain pipe 10, which conducts it back to the bottom of the separator. Baffle 4 then deflects the gas out toward the shell of the separator tank where it passes between the baffle and the inside of the tank, through the space 11, and from there it is forced against the underside of the top head 12 of the tank, where it is again robbed of any oil or heavy properties. The dry gas then enters the gas outlet tube 13 which conveys it to the regular gas line (not shown).

This process permits the gas to be scrubbed along the bottom side of the baffle 4, against the inside of the separator tank where it passes through the space 11 around said baffle and then again against the underside of the top head of the separator, any oil properties falling on the top surface of the baffle 4 being conducted by the small drain pipe 9 to the pipe 10 through which it finds the oil containing portion of the tank, whence it is carried off in the usual manner through the oil outlet 14.

From the foregoing, it is believed that my invention may be clearly understood without further description, and in closing I may state that numerous changes may be made in the details of my construction without departing from the spirit of the invention as disclosed in the following claims.

It may also be stated that while I have described this arrangement of baffles, as employed in a combined oil and gas separator, flow tank and scrubber, it is obvious that it can be used for any analogous purpose, and with any form of container, or apparatus desired.

What I claim and desire to secure by Letters Patent is:—

1. An arrangement of baffles in a container, including a conical perforated baffle secured to the inner wall of said container, a solid conical baffle secured to and above said perforated baffle and spaced apart from the wall of said container, and means for conveying any heavy products which may rise to the top of said container, back to the bottom thereof.

2. A container, inlets in said container, means within said container adjacent said inlets for deflecting incoming fluids downwardly, allowing any vapors to rise, a perforated baffle secured to the inner wall of said container above said deflecting means, a solid baffle secured to and above said perforated baffle and spaced apart from the wall of said container, and means for conveying any heavy products which may rise with the vapor, back to the bottom of the container.

3. A container, inlets in said container, baffles within said container adjacent said inlets for deflecting incoming fluids downwardly, allowing any vapors to rise, a conical perforated baffle secured to the inner wall of said container above said inlet baffles, a solid conical baffle secured to and above said perforated baffle and spaced apart from the wall of said container, a drain pipe secured to said perforated baffle for conveying heavy products to the bottom of said container and a smaller drain pipe secured to said solid baffle in line with said former drain pipe.

4. A container as claimed in claim 2 wherein the perforations in said baffle are raised on the upper surface of said baffle.

5. A container as claimed in claim 2, wherein the means for deflecting the fluids downwardly consist of baffles secured to the wall of said container and projecting inwardly and downwardly.

In testimony whereof I affix my signature.

M. F. WATERS.